United States Patent
Prel et al.

(10) Patent No.: US 7,530,744 B2
(45) Date of Patent: May 12, 2009

(54) PLUG-IN FIBER-OPTIC CONNECTOR FOR USE IN A FLUID MEDIUM

(75) Inventors: Christophe Prel, La Fleche (FR); Yohann Guittet, Change (FR)

(73) Assignee: Carrier Kheops Bac, Le Mans (FR)

( * ) Notice: Subject to any disclaimer, the term of this patent is extended or adjusted under 35 U.S.C. 154(b) by 0 days.

(21) Appl. No.: 11/914,051

(22) PCT Filed: Aug. 18, 2005

(86) PCT No.: PCT/FR2005/002103

§ 371 (c)(1),
(2), (4) Date: Dec. 17, 2007

(87) PCT Pub. No.: WO2006/120308

PCT Pub. Date: Nov. 16, 2006

(65) Prior Publication Data
US 2008/0205831 A1    Aug. 28, 2008

(30) Foreign Application Priority Data
May 9, 2005    (FR) ................... 05 04617

(51) Int. Cl.
G02B 6/44    (2006.01)
(52) U.S. Cl. ....................... 385/53; 385/111

(58) Field of Classification Search ............. None
See application file for complete search history.

(56) References Cited

U.S. PATENT DOCUMENTS

| 4,411,491 A | 10/1983 | Larkin et al. |
| 4,887,883 A | 12/1989 | Darbut et al. |
| 6,315,461 B1 | 11/2001 | Cairns |

FOREIGN PATENT DOCUMENTS

| GB | 2 342 461 A | 4/2000 |
| WO | 86/02173 A1 | 4/1986 |

*Primary Examiner*—Tina M Wong
(74) *Attorney, Agent, or Firm*—Sughrue Mion, PLLC

(57) ABSTRACT

A plug-in fiber-optic connector (5) for use in a fluid medium, characterized in that the rear tubular portion (21) of the plug is slidingly urged into the body portion (7) first to compress the plug piston chamber (17) then to enable the optical fluid (19) to be discharged at the end of the centring portion (13) and the front portion (9) of the plug, whereby the front end of the optical fiber (5) is dried and cleared of fluid and foreign particles, whereas the centring portion (55) of the base is driven back by the pressure exerted by the plug in such a way that the end of the optical fiber (5) thereof extending outwards into the centring portion (13) of the plug, in alignment with the fiber (5) of the plug (3), is similarly dried by the compressive effect of the piston chamber (59) thereof.

14 Claims, 3 Drawing Sheets

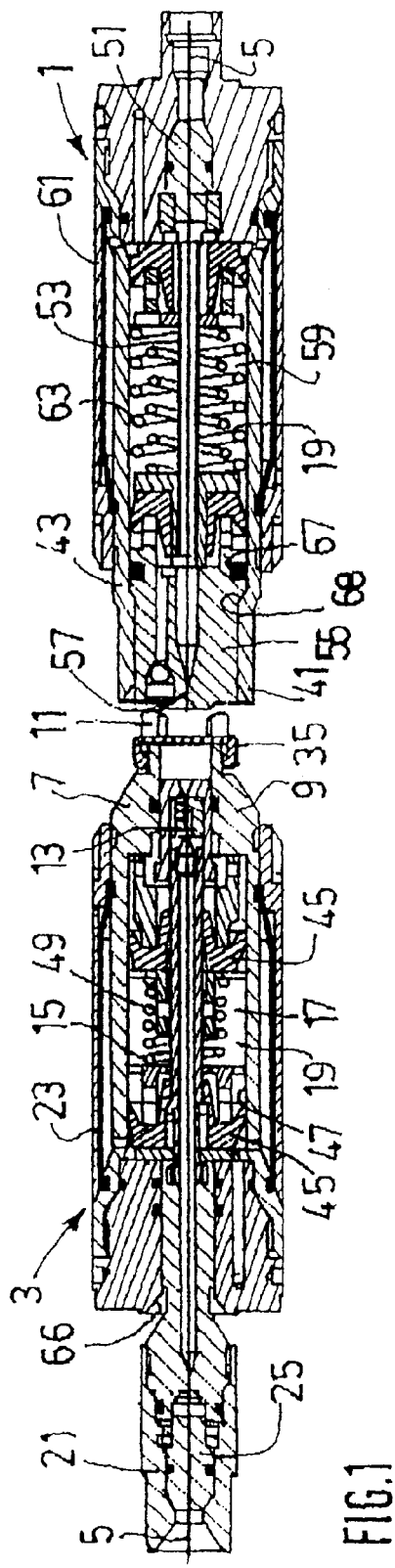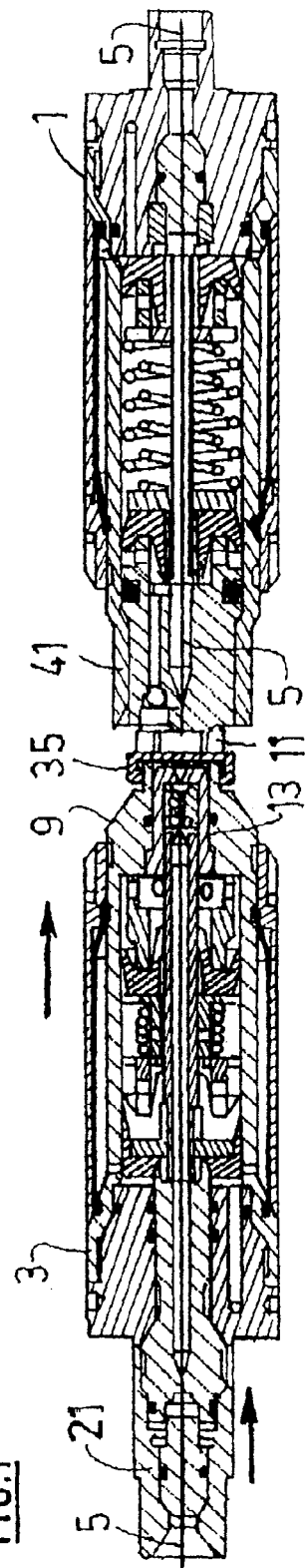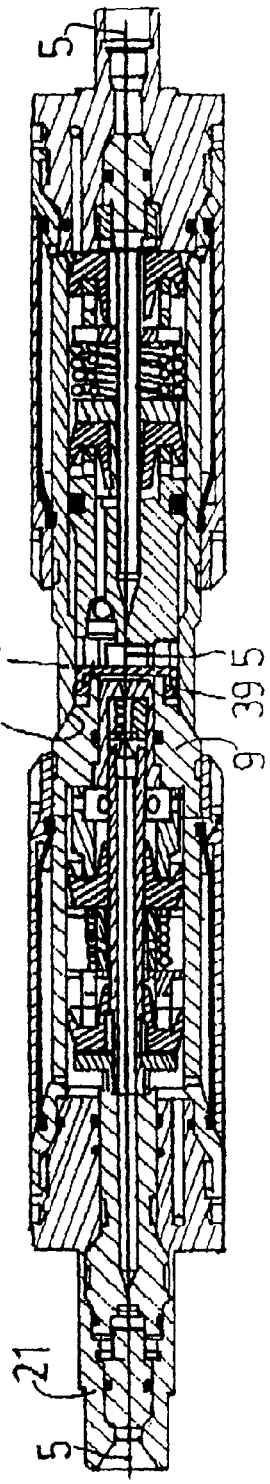

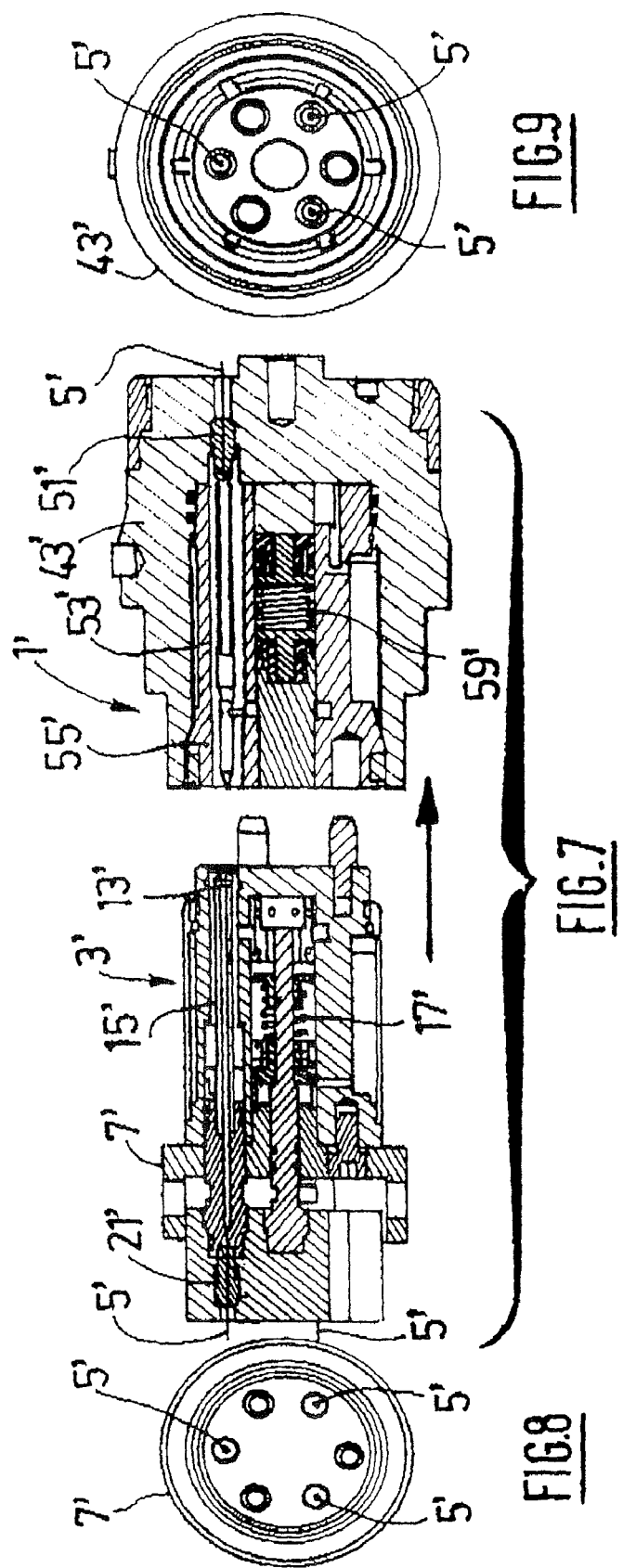

PLUG-IN FIBER-OPTIC CONNECTOR FOR USE IN A FLUID MEDIUM

The invention relates to a plug-in fiber-optic connector for use in a fluid medium, and in particular for an application at the bottom of an oil well under severe temperature and pressure conditions, namely above 130° C. and 1200 bar.

Known fiber-optic connectors fail to meet this particular application satisfactorily.

According to the invention, what is proposed is a plug-in fiber-optic connector, for use in a fluid medium, comprising a fixed connector part or socket and a mobile connector part or plug intended to mate with the socket in order to establish a connection for the optical fiber contained in said connector parts, characterized in that the plug comprises:

- a body portion of axial cylindrical general configuration, provided with a front portion having at least one hole for passage of an optical fiber;
- at least one channel portion housing an optical fiber and lying in the body portion parallel to its axis;
- at least one rear tubular portion to which the optical fiber is hermetically fastened, connected to said at least one channel portion and mounted so as to slide sealingly in the body portion parallel to the axis of the body portion;
- at least one front centering portion for centering the optical fiber, connected at the front end of the channel portion and mounted so as to slide parallel to the axis of the body portion and sealingly in the body portion, said at least one channel portion, said rear tubular portion and said at least one front centering portion constituting a first mobile linear element for connecting the optical fiber;
- a piston chamber with opposed pistons, which is mounted axially in the body portion, contains an optical fluid and is kept in extension by a helical spring pressing against the pistons; and
- an external membrane surrounding the body portion, containing the optical fluid communicating with the piston chamber, said at least one channel portion, said at least one centering portion and said at least one front portion, and bringing the assembly into equipressure with the external fluid, and in that the socket additionally includes:
- a body portion of similar configuration to that of the plug, provided with a front portion complementary to within a clearance to that portion of the plug;
- at least one channel portion housing an optical fiber and lying in the body portion parallel to the body portion axis;
- at least one rear tubular portion to which the optical fiber is hermetically fastened, connected to said at least one channel portion and fixedly mounted in said body portion parallel to the body portion axis;
- at least one front centering portion for centering the optical fiber, intended to make it emerge via the front portion, upon meeting the connector parts, which is mounted so as to slide sealingly in the body portion parallel to the body portion axis, said at least one channel portion, said at least one rear tubular portion and said at least one front centering portion constituting a second connection element for connecting the optical fiber, which is intended to be mated in a centered manner and in alignment with said first connection element when in service;
- a piston chamber with opposed pistons, which is mounted axially in the body portion, contains an optical fluid, the same as that of the plug, is kept in extension by a helical spring pressing against the pistons, and is connected to the front centering portion; and
- an external membrane surrounding the body portion, containing optical fluid in communication with the piston chamber, said at least one channel portion, said at least one centering portion and the front portion, and bringing the assembly into equipressure with the external fluid, the plug mating, in the service position, with the socket by applying and centeredly inserting the front portion of its body into the front portion of the socket, and by applying said at least one centering portion of the plug against the corresponding centering portion of the socket, said at least one rear tubular portion of the plug being slidingly pushed into the body portion in order to compress the piston chamber of the plug, in a first step, and to allow ejection of the optical fluid at the end of said at least one centering portion and corresponding front portion of the plug in order to wipe dry the front end of the optical fiber and expel the fluid and the external particles, whereas the centering portion of the base is retracted under the pressure of the plug so as likewise to wipe dry, under the compression of its piston chamber, that end of its optical fiber which emerges right in the centering portion of the plug, being aligned with the fiber of the plug, the optical connection being made by the two fibers coming into contact with each other and the slight contact clearance being absorbed by the fibers bending in their respective channel portion.

The connector according to the invention may comprise in each body portion a variable number of said connection elements for connecting an optical fiber, these elements being distributed in a defined geometry with or without axial symmetry, complementarily, one of the connector body portions with respect to the other; and said elements for connecting an optical fiber cooperate, upon connection and upon disconnection, simultaneously and with an identical translation amplitude.

Said at least one rear tubular portion of the plug is stopped when sliding in the body portion so as to ensure, on plugging the plug into the socket, a displacement of the plug in the socket equal to the sliding displacement of each rear tubular portion in its body and, likewise, of the respective fibers of the plug and of the socket up to the point of connection between these fibers in the final plugged-in position.

Advantageously, said at least one rear tubular portion of the plug has a stop surface for butting against a complementary surface of the body portion and constituting an impermeable barrier to the external fluid under high application pressure.

This rear tubular portion of the plug, which hermetically receives the connector cable, is furthermore mounted in a sealed manner in the body portion by means of a set of O-ring seals placed in front of said stop surface.

The front portion of the plug furthermore includes a front flexible membrane at its end, which is pierced axially with a hole at least equal to the diameter of the fiber and prevents the external particles from penetrating into the plug, forming a sealing barrier to the external fluid right from the start of the plugging-in operation and wiping dry the fiber of the socket as it passes into the plug during the plugging-in operation.

This front portion of the plug includes a guiding element for the plugging-in operation, promoting ejection of the optical fluid for the purpose of expelling the particles and external fluid that are present at the end of the front portions of the connector, said element consisting for example of centering teeth or of a centering surface with vents for flow of the optical fluid.

Furthermore, as a complement to the sealing of the front portions of the plug and of the socket, under the sliding retraction of the centering portion in its body portion, the front end of this body portion is applied sealingly under the plug-in pressure against the corresponding body portion of the plug, advantageously by means of complementary axial conical surfaces.

Said at least one centering portion of the socket simply includes, in continuity with the bore of the corresponding channel portion with a relatively large diameter in order to allow the plug to flex, an axial internal conical recess turned toward the front end and extended by an axial bore with a diameter at least equal to that of the fiber for its axial passage with slight clearance.

Said at least one centering portion of the plug is of known configuration, comprising three front balls positioned in the form of a triangle and in contact, in order to allow passage of the fiber with a slight clearance at the center, and two longitudinal rollers forming, with at least one upper retaining ball, a recess forcing the fiber to pass toward the alignment axis.

The piston chambers of the plug and the socket are of similar configuration, each having two opposed pistons of the type with peripheral lips that are turned toward the front and channel the fluid toward the front, the front piston having a front volume capable of expelling the optical fluid toward the front, especially when the connector is disconnected, in order to prevent the return of the external fluid.

The stiffness of the helical spring of the piston chamber of the socket is greater than that of the corresponding spring of the piston chamber of the plug, so as to ensure aforementioned successive chamber compression sequences, especially in the first place the compression of the piston chamber of the plug.

It follows from this arrangement of the connector according to the invention that it protects the fibers contained therein, both upon connection and upon disconnection, while ejecting, at both these operations, sufficient optical fluid, on the one hand, to clean the front parts of the connector of any dirt and, on the other hand, to prevent the external fluid from getting back into the front parts of the connector.

The invention is illustrated below using exemplary embodiments with reference to the appended drawings in which:

FIG. 1 is an axial longitudinal sectional view of a connector according to the invention in the disconnected position;

FIG. 2 is a view similar to FIG. 1 showing the plugging-in operation of inserting the plug of the connector into the socket;

FIG. 3 shows the connector in the connected position;

FIG. 7 is a longitudinal sectional view of an alternative embodiment of a connector according to the invention, comprising three elements for connecting an optical fiber; and FIGS. 8 and 9 are views of the front faces of the plug and socket of the connector, respectively.

Figure 6:
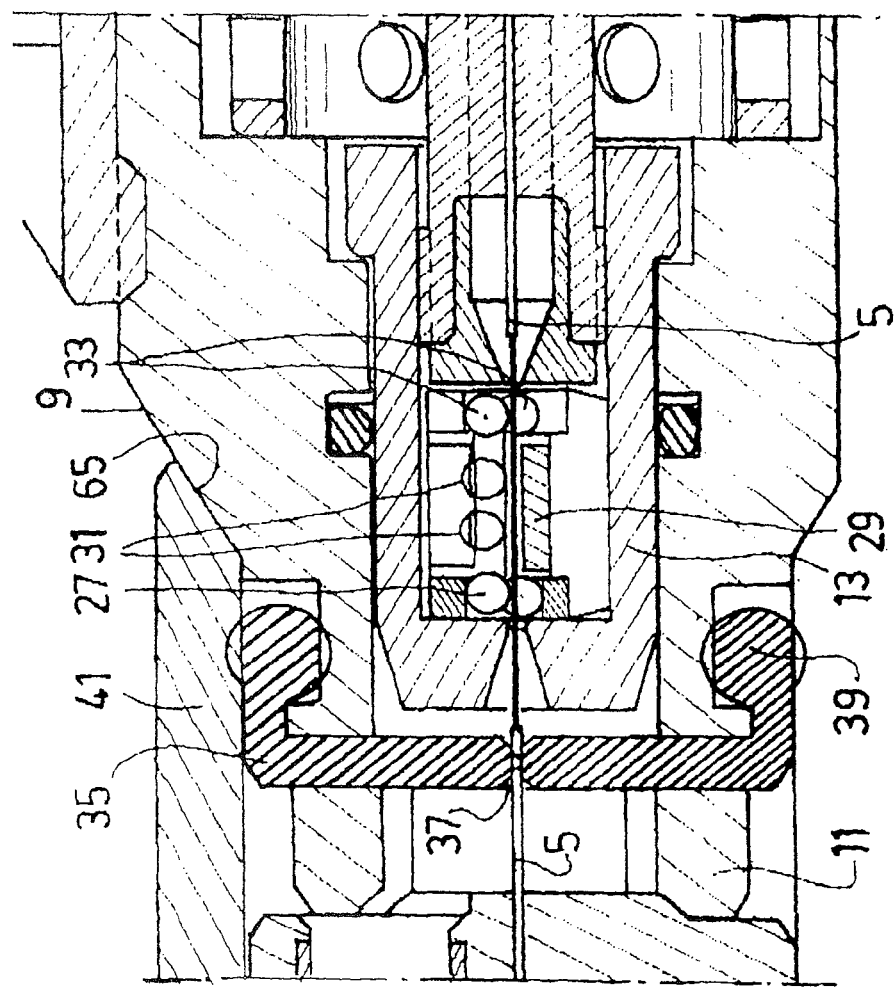
FIG. 6 is an enlarged axial longitudinal sectional view showing the connection of the fibers in the connected position and their alignment.
Figure 4:
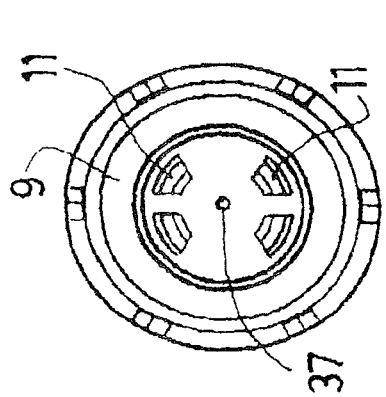
FIGS. 4 and 5 are front views of the plug and socket of the connector.
Figure 5:
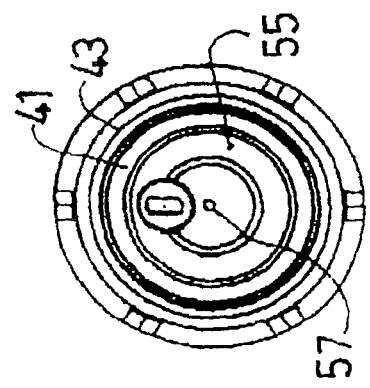

Referring to the drawings, the connector shown in FIGS. 1 to 6 comprises a socket 1, which may or may not be fixed, and a mobile plug 3 intended to be plugged into the socket 1 for the purpose of making an optical connection between the continuous linear fiber-optic elements, or optical fibers 5, contained in the plug 3 and in the socket 1, these being connected to corresponding optical cables (not shown) each accommodating a fiber-optic element.

The plug 3 comprises a body portion 7 of cylindrical configuration, a conical profiled front portion 9 with projecting front teeth 11, a centering portion 13 for centering the optical fiber 5, adjacent to the front portion 9, a channel portion 15 lying axially relative to the bodies 7 and containing the optical fiber 5, which is connected to the centering portion 13, a piston chamber 17 filled with optical fluid 19 surrounding the channel portion 15 in the central portion of the body 7, and a rear tubular portion 21 connected to the channel portion 15 at the rear of the piston chamber 17 and mounted so as to slide in the body portion 7.

An elastomeric membrane 23 surrounds the body portion 7 on the periphery and contains optical fluid 19, this in communication with the piston chamber 17, the centering portion 13 and the front portion 9 by means of communication holes formed in each of these elements.

The optical cable is hermetically mounted on the rear tubular portion 21, on the outside of the latter. The optical fiber 5 is mounted so as to be integral with the rear tubular portion 21 by brazing a metal welding alloy onto the metal support 25 of the tubular portion 21, or by bonding sintered glass directly onto the bare optical fiber which makes it possible to seal against the external fluid (seawater or other fluids) and to withstand a high-temperature high-pressure environment of greater than 130° C. and 1200 bar, unlike the conventional connectors if the fiber is fixed by an epoxy synthetic material onto this rear portion, which rapidly degrades under these conditions.

The channel portion 15 houses the optical fiber 5 with the possibility of it bending slightly, said channel portion having a bore diameter equal to two or more times that of the optical fiber 5. This portion is connected axially to the front centering portion 13, which is intended to guide the optical fiber 5 axially.

This centering portion 13 includes, as is known (see FIG. 6), three front balls 27, two rear adjacent longitudinal rollers 29, two balls 31 applied against the rollers 29 to within a passage clearance for the fiber 5, and three rear balls 33 arranged in the form of an equilateral triangle and in contact with one another, like the three front balls 27. The end of the optical fiber 5 lies substantially at the middle of the centering portion 13, being kept in this position.

The front portion 9 integral with the body portion 7 is mounted adjacent to the centering portion 13, being provided with a flexible elastomeric membrane 35 mounted on the front edge and provided with a hole 37 for passage, with a slight clearance, of the optical fiber of the socket.

This front portion also includes projecting teeth 11 (FIG. 4) circumferentially distributed on its front edge and chamfered in their circumferentially inner end, to ensure that the plug is preguided upon being plugged into the socket 1 and to make it easier to remove any dirt during connection.

The hole in the membrane allows ejection of the optical fluid 19, especially upon compressing the piston chamber 17, wipes dry the passing optical fiber 5 (of the socket) and prevents ingress of the external fluid.

The outer flange 39 for fixing the membrane 35 cooperates with the cylindrical front bored portion 41 of the body 43 of the socket so as to ensure sealing during the plugging-in operation and, likewise, the front portion 41 of the socket cooperates via its end with the conical front portion 9 of the plug, with pressure contact, in order to complete the sealing at the end of the plugging-in operation.

The piston chamber 17 lying behind the centering portion 13 is bounded on the periphery by the body portion 7 and on its ends by two opposed piston elements 45. It contains optical fluid 19, the refractive index of which is close to that of the fiber so as to promote the optical connection of the fibers (for signal transmission).

The pistons 45 are of the type with a peripheral flexible lip directed toward the front, sliding in the bore 47 of the body portion and sliding on the channel portion with a slight clearance. A helical spring 49 housed around the channel portion presses against said pistons, at their base. During the connection and disconnection of the connector, said pistons, through their relative movement in the chamber, allow the optical fluid 19 to be ejected to the front portion 9.

The peripheral membrane 23 is a flexible membrane resistant to solvents. It forms the reservoir for the optical fluid 19 contained in the plug, respectively in the piston chamber 17, the channel portion 15, the centering portion 13 and the front portion 9, which portions are in communication via suitable holes, and brings these portions into equipressure with the external fluid.

The socket 1 comprises, in a configuration substantially similar to that of the plug 3, a cylindrical body portion 43 with a diameter equivalent to that of the body of the plug, connected via its rear portion to the optical cable (not shown), a rear tubular portion 51 hermetically imprisoning the optical fiber 5 contained therein (as in the case of the plug) and forming a sealing barrier to the pressure of the external fluid, an axial cylindrical channel portion 53 housing the optical fiber 5, so that the latter can flex, with a diameter equivalent to that of the channel portion 15 of the plug, connected to the rear tubular portion 51 and extending as far as a front centering portion 55 provided with a passage hole 57 (FIG. 5) for the fiber 5, a piston chamber 59 mounted in the central portion of the body 43 and around the channel portion 53, and an external membrane 61 surrounding the body portion 43, this being equivalent to the membrane of the plug.

The piston chamber 59 is similar to that of the plug, except for the hardness of the internal helical spring 63, which is higher than that of the spring 49 of the piston chamber of the plug.

The front centering portion 55 is mounted so as to slide sealingly to the front of the body portion 43 until, upon disconnection, it reaches the front stop on complementary conical surfaces 68 under the pressure of the spring 63, these stop surfaces forming a sealing barrier under the pressure of application during disconnection, said barrier being supplemented by means of internal rear flexible O-ring seals 67.

The operation will now be described. Starting from the disconnected position shown in FIG. 1, the plug 3 is inserted into the socket 1 via their front portions 9, 41 which fit together in a centered manner. The operation is carried out using a tool (not shown) which makes it possible to perform a continuous steady action with a large force.

The insertion is continued (FIG. 2) and the body portion 7 of the plug slides back, relative to the central assembly portion 9, 13, 15, 21, until it reaches the sealing stop via its rear end 66 on the rear tubular portion 21, while the optical fluid 19 is ejected forward under the pressure of the compressed piston chamber 17, cleans the front portion 9, ejects the attached particles and dirt, and wipes dry the penetrating fiber 5 of the socket 1.

Next, the centering portion 55 of the socket retracts, compressing the piston chamber 59 of the socket, thereby prolonging the ejection of optical fluid 19 toward the front. The optical fiber 5 is then out of the centering portion 55 and the front portion 41, and penetrates the centering portion 13 of the plug.

The end of connection travel (FIG. 3) is reached when the front end of the body 43 butts against the front conical portion of the body 7 of the plug and, at this moment, sealing is provided by high-pressure application in abutment 65 of the facing conical surfaces and by the flange 39 of the membrane 35 of the plug, as mentioned above. The optical fiber 5 of the socket 1 is then in contact with that of the plug 3, substantially in the middle of the centering portion 13 of the plug and the slight application clearance is absorbed by the rear bending of the fibers 5 in the opposed channel portions 15, 53 of the connector.

Disconnection is performed and obtained in the reverse manner, with ejection of optical fluid 19 toward the front, as mentioned above.

According to an alternative embodiment illustrated in FIGS. 7 to 9, the connector according to the invention may comprise several identical connection elements for connecting an optical fiber 5' in each of the body portions of the plug 7' and of the socket 43', three elements in the example, which may or may not be arranged in a defined geometry. According to the example shown, these elements are in an axial circular configuration in cross section and each is parallel to the axis of the body portions of the connector.

The various constituent elements of each of the fiber-optic connection elements (channel portion 15', 53', rear tubular portion 21', 51' and front centering portion 13', 55') are similar to those of the connector described above in the case of one optical fiber, making it possible, by the plug 3' being plugged axially into the socket 1', for each of the optical fibers 5' contained therein to be connected and disconnected simultaneously, with contact bending of each fiber equivalent to that of the fiber of the aforementioned connector for a single optical fiber.

Only the pressure chambers 17', 59' of the opposed body portions of this connector are unique, each placed centrally in the corresponding body portion, being common to all the fiber-optic connection elements of a body portion via connecting through-holes ensuring that the optical fluid in the pressure chamber communicates with the fiber-optic connection elements.

Of course, upon connecting and disconnecting the connector, the fiber-optic connection elements cooperate simultaneously in their respective body portions and with an identical translation amplitude.

The invention claimed is:

1. A plug-in fiber-optic connector, for use in an external fluid medium, comprising a fixed connector part socket (1, 1') and a mobile connector part plug (3, 3') configured to mate with the socket (1, 1') in order to establish a connection between optical fibers (5, 5') contained in said connector parts, characterized in that the plug (3, 3') comprises:

a body portion (7, 7') of axial cylindrical general configuration, provided with a front portion (9) having at least one hole for passage of an optical fiber (5, 5');

at least one channel portion (15, 15') housing the optical fiber (5, 5') and lying in the body portion (7, 7') parallel to an axis of the body portion;

at least one rear tubular portion (21, 21') to which the optical fiber (5, 5') is hermetically fastened, connected to said at least one channel portion (15, 15') and mounted so as to slide sealingly in the body portion (7, 7') parallel to the axis of the body portion;

at least one front centering portion (13, 13') for centering the optical fiber (5, 5'), connected at a front end of the channel portion (15, 15') and mounted so as to slide parallel to the axis of the body portion and sealingly in the body portion (7, 7'), said at least one channel portion (15, 15'), said at least one rear tubular portion (21, 21') and said at least one front centering portion (13, 13') constituting a mobile linear first connection element for connecting the optical fiber;

a piston chamber (17, 17') with opposed pistons, which is mounted axially in the body portion (7, 7'), said pistons containing an optical fluid (19) and kept in extension by a helical spring pressing against the pistons; and an external membrane (23) surrounding the body portion (7, 7') and containing the optical fluid (19) communicating with the piston chamber (17, 17'), said at least one channel portion (15, 15'), said at least one centering portion (13, 13') and said at least one front portion (9), and bringing the assembly into equipressure with the external fluid;

and in that the socket (1, 1') additionally comprises:

a body portion (43, 43') comprising a front portion (41) configured for mating with the front portion of the plug;

at least one channel portion (53, 53') housing an optical fiber (5, 5') and lying in the body portion (43, 43') parallel to the body portion axis;

at least one rear tubular portion (51, 51') to which the optical fiber (5, 5') is hermetically fastened, connected to said at least one channel portion (53, 53') and fixedly mounted in said body portion (43, 43') parallel to the body portion axis;

at least one front centering portion (55, 55') for centering the optical fiber (5), configured to make the optical fiber emerge via the front portion (41), upon coupling of the connector parts, the front centering portion mounted so as to slide axially and sealingly in the body portion (43, 43') parallel to the body portion axis, said at least one channel portion (53, 53'), said at least one rear tubular portion (51, 51') and said at least one front centering portion (55, 55') constituting a second connection element for connecting the optical fiber, and which is configured to mate in a centered manner and in alignment with said first connection element when in service;

a piston chamber (59, 59') with opposed pistons, which is mounted axially in the body portion (43, 43'), said pistons containing an optical fluid (19), the same as that of the plug, kept in extension by a helical spring pressing against the pistons, and connected to the front centering portion (55, 55'); and an external membrane (61) surrounding the body portion (43, 43') and containing the optical fluid (19) in communication with the piston chamber (59, 59'), said at least one channel portion (53, 53'), said at least one centering portion (55, 55') and said front portion, and bringing the assembly into equipressure with the external fluid; and wherein the plug (3, 3') mates, in a service position, with the socket (1, 1') by centrally inserting the front portion (9) of the plug into the front portion (41) of the socket, and by applying said at least one centering portion of the plug against the corresponding centering portion of the socket, said at least one rear tubular portion (21, 21') of the plug being slidingly pushed into the body portion (7, 7') of the plug in order to compress the piston chamber (17, 17') of the plug, in a first step, and to allow ejection of the optical fluid (19) from an end of said at least one centering portion (13, 13') of the plug and corresponding front portion (9) of the plug in order to wipe dry the front end of the optical fiber (5, 5') and expel the fluid and the external particles; and wherein, when the plug mates in the service position with the socket, the centering portion (55, 55') is retracted under pressure of the plug so as to wipe dry, under the compression of the piston chamber (59, 59') of the socket, an end of the optical fiber (5, 5') that emerges right in the centering portion (13, 13') of the plug, being aligned with the fiber (5, 5') of the plug (3), the optical connection being made by the two fibers (5, 5') coming into contact with each other and any slight contact clearance being absorbed by the fibers (5, 5') bending in their respective channel portion (15, 15'; 53, 53').

2. The fiber-optic connector as claimed in claim 1, further comprising, in each body portions, a plurality of said first and second connection elements for connecting optical fibers said plurality of said first and second connection elements being distributed in a defined geometry with or without axial symmetry.

3. The fiber-optic connector as claimed in claim 1 or 2, characterized in that said first and second elements cooperate, upon connection and upon disconnection, simultaneously and with an identical translation amplitude.

4. The fiber-optic connector as claimed in claim 1, characterized in that said at least one rear tubular portion (21, 21') of the plug is stopped when sliding in the body portion (7, 7') so as to ensure, on plugging the plug (3, 3') into the socket (1, 1'), a displacement of the plug (3, 3') in the socket (1, 1') equal to the sliding displacement of each rear tubular portion (21, 21') in the body (7, 7') and, likewise, of the respective fibers (5, 5') of the plug and of the socket up to a point of connection between the respective fibers (5, 5') in the final service position.

5. The fiber-optic connector as claimed in claim 1, characterized in that said at least one rear tubular portion (21, 21') of the plug (3, 3') has a stop surface for butting against a complementary surface of the body portion (7, 7') of the plug so as to create an impermeable barrier to the external fluid under high application pressure.

6. The fiber-optic connector as claimed in claim 1, characterized in that said at least one rear tubular portion (21, 21') of the plug, is mounted in a sealed manner in the body portion (7, 7') by a set of O-ring seals placed in front of a stop surface that buts against a complementary surface of the body portion (7, 7') of the plug.

7. The fiber-optic connector as claimed in claim 1, characterized in that the front portion (9) of the plug furthermore comprises a front flexible membrane (35) at an end of the front portion of the plug, which is pierced axially with a hole (37) at least equal to a diameter of the fiber and prevents the external particles from penetrating into the plug, furthermore forming a sealing barrier to the external fluid right from the start of plugging the plug into the socket and wiping dry the fiber (5, 5') of the socket as the fiber of the socket passes into the plug (3, 3') while plugging the plug into the socket.

8. The fiber-optic connector as claimed in claim 1, characterized in that the front portion (9) of the plug comprises a guiding element for plugging the plug into the socket, promoting ejection of the optical fluid (19) for the purpose of expelling the particles and external fluid that are present at the end of the front portions (9, 41) of the connector.

9. The fiber-optic connector as claimed in claim 1, characterized in that, as a complement to sealing of the front portions of the plug and of the socket (9, 41) in the service position at the completion of plugging the plug into the socket, under the sliding retraction of said at least one centering portion (55, 55') in the body portion (43, 43') of the socket, the front end of body portion (43) of the socket is applied sealingly (65) under pressure against the corresponding body portion (7) of the plug by complementary axial conical contact surfaces.

10. The fiber-optic connector as claimed in claim 1, characterized in that said at least one centering portion (55, 55') of the socket comprises, in continuity with a bore of the corresponding channel portion (53, 53') with a relatively large diameter in order to allow the fiber (5, 5') to flex, an axial internal conical recess turned toward a front end of the socket and extended by an axial bore (57) with a diameter at least equal to that of the fiber (5, 5') for axial passage of the fiber.

11. The fiber-optic connector as claimed in claim 1, characterized in that said at least one centering portion (13, 13') of the plug comprises three front balls (27) positioned in a form of a triangle and in contact, in order to allow passage of the fiber (5, 5') with a slight clearance at the a center of the triangle, and two longitudinal rollers (29) forming, with at least one upper retaining ball (31), a recess forcing the fiber (5, 5') to pass toward an alignment axis.

12. The fiber-optic connector as claimed in one claim 1, characterized in that the piston chambers (17, 59; 17', 59') of the plug and the socket are of similar configuration, each having two opposed pistons (45) with lips that are turned toward a front of the corresponding plug or socket and that channel the fluid toward the front, the front piston having a front volume capable of expelling the optical fluid (19) toward the front, especially when the connector is disconnected, in order to prevent the return of the external fluid.

13. The fiber-optic connector as claimed in claim 1, characterized in that a stiffness of the helical spring (63) of the piston chamber of the socket is greater than that of the corresponding spring (49) of the piston chamber of the plug so as to ensure successive chamber compression sequences, with in the first place compression of the piston chamber (17, 17') of the plug.

14. The fiber-optic connector as claimed in claim 8, wherein said guiding element comprises centering teeth or a centering surface with vents for flow of the optical fluid.

* * * * *